United States Patent
Kim et al.

(10) Patent No.: US 10,616,907 B2
(45) Date of Patent: Apr. 7, 2020

(54) METHOD AND DEVICE FOR TRANSMITTING CONTROL CHANNEL ON BASIS OF HYBRID BEAMFORMING IN WIRELESS COMMUNICATION SYSTEM

(71) Applicant: LG ELECTRONICS INC., Seoul (KR)

(72) Inventors: Kitae Kim, Seoul (KR); Jiwon Kang, Seoul (KR); Kilbom Lee, Seoul (KR); Heejin Kim, Seoul (KR); Dongkyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 15/532,956

(22) PCT Filed: Dec. 2, 2015

(86) PCT No.: PCT/KR2015/013086
§ 371 (c)(1),
(2) Date: Jun. 2, 2017

(87) PCT Pub. No.: WO2016/089122
PCT Pub. Date: Jun. 9, 2016

(65) Prior Publication Data
US 2018/0270844 A1      Sep. 20, 2018

Related U.S. Application Data

(60) Provisional application No. 62/086,202, filed on Dec. 2, 2014.

(51) Int. Cl.
*H04B 7/06*     (2006.01)
*H04W 72/12*    (2009.01)
(Continued)

(52) U.S. Cl.
CPC ........ *H04W 72/121* (2013.01); *H04B 7/0452* (2013.01); *H04B 7/0617* (2013.01);
(Continued)

(58) Field of Classification Search
None
See application file for complete search history.

(56) References Cited

U.S. PATENT DOCUMENTS 8,315,223 B2* 11/2012 Tsutsui ............... H04B 7/0639
                                                  370/208
2009/0104926 A1* 4/2009 Suh ..................... H04B 7/061
                                                  455/513
(Continued)

FOREIGN PATENT DOCUMENTS

EP      2819313          12/2014
JP      2010-028737 A    2/2010
(Continued)

OTHER PUBLICATIONS

PCT International Application No. PCT/KR2015/013086, International Search Report dated Mar. 10, 2016, 2 pages.
(Continued)

*Primary Examiner* — Ajit Patel
(74) *Attorney, Agent, or Firm* — Lee Hong Degerman Kang Waimey

(57) ABSTRACT

Provided is a method for transmitting control information for hybrid beamforming in a wireless communication system. A base station groups a plurality of terminals on the basis of feedback information on analog beams, and multiplexes and transmits control information of terminals within each group by using a specific time-frequency resource. A plurality of terminals can be grouped on the basis of feedback information on a plurality of analog beams through various methods. In addition, control information of termi-
(Continued)

nals within each group can be multiplexed through various methods.

8 Claims, 20 Drawing Sheets

(51) Int. Cl.
    *H04B 7/0452*     (2017.01)
    *H04L 5/00*     (2006.01)
    *H04W 72/04*     (2009.01)
    *H04W 72/08*     (2009.01)
    *H04W 72/14*     (2009.01)

(52) U.S. Cl.
    CPC ......... *H04L 5/0023* (2013.01); *H04W 72/042* (2013.01); *H04W 72/085* (2013.01); *H04W 72/14* (2013.01)

(56) References Cited

U.S. PATENT DOCUMENTS

| | | | |
|---|---|---|---|
| 2010/0177717 A1* | 7/2010 | Sung | H04W 72/042 370/329 |
| 2010/0279619 A1* | 11/2010 | Yeh | H04B 7/024 455/63.1 |
| 2010/0290549 A1* | 11/2010 | Yang | H04B 7/0617 375/260 |
| 2014/0044044 A1 | 2/2014 | Josiam et al. | |
| 2014/0126620 A1 | 5/2014 | Maltsev et al. | |
| 2014/0177607 A1 | 6/2014 | Li et al. | |
| 2015/0003325 A1* | 1/2015 | Sajadieh | H04W 76/10 370/328 |
| 2015/0333894 A1* | 11/2015 | Wang | H04L 5/0073 370/329 |
| 2016/0165630 A1* | 6/2016 | Oteri | H04W 74/04 370/336 |
| 2016/0262181 A1* | 9/2016 | Lee | H04B 7/04 |

FOREIGN PATENT DOCUMENTS

| | | |
|---|---|---|
| KR | 10-2013-0097117 A | 9/2013 |
| KR | 10-2013-0127376 A | 11/2013 |
| KR | 10-2014-0066484 A | 6/2014 |
| WO | 2013125917 | 8/2013 |

OTHER PUBLICATIONS

European Patent Office Application Serial No. 15865925.0, Search Report dated Oct. 29, 2018, 9 pages.

* cited by examiner

METHOD AND DEVICE FOR TRANSMITTING CONTROL CHANNEL ON BASIS OF HYBRID BEAMFORMING IN WIRELESS COMMUNICATION SYSTEM

CROSS-REFERENCE TO RELATED APPLICATIONS

This application is the National Stage filing under 35 U.S.C. 371 of International Application No. PCT/KR2015/013086, filed on Dec. 2, 2015, which claims the benefit of U.S. Provisional Application No. 62/086,202 filed on Dec. 2, 2014, the contents of which are all hereby incorporated by reference herein in their entirety.

BACKGROUND OF THE INVENTION

Field of the Invention

The present invention relates to wireless communications, and more particularly, to a method and device for transmitting a control channel on the basis of hybrid beamforming in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As a way to improve the efficiency of limited resources, so-called multi-antenna technology is being actively developed which achieves diversity gain by putting multiple antennas on the transmitter and receiver to cover more spatial regions for resource utilization, and which increases transmission capacity by transmitting data in parallel through each antenna. Multi-antenna technology may employ beamforming and/or precoding to improve signal-to-noise ratio (SNR). In closed-loop systems that can use feedback information at the transmitting end, beamforming and/or precoding may be used to maximize SNR through such feedback information. Beamforming is broadly classified into analog beamforming and digital beamforming.

Massive multiple-input multiple-output (MIMO) is a multi-antenna technology in which tens of antennas or even more, which is a lot more than now, are put into a base station to achieve higher data rates and higher energy efficiency. When conventional analog beamforming and/or digital beamforming is directly used in massive MIMO, signal processing and/or hardware implementation can get very complex, or the performance increase through the use of multiple antennas is only slight and the flexibility of resource allocation may be reduced. Consequently, the use of hybrid beamforming, a combination of conventional analog and digital beamforming, in massive MIMO is under discussion.

Meanwhile, it may be difficult to transmit control channels simultaneously to every user because the transmission range of analog beams is limited due to the characteristics of hybrid beamforming. Therefore, control channel resource scheduling should be done in consideration of analog beam constraints.

SUMMARY OF THE INVENTION

The present invention provides a method and device for transmitting a control channel on the basis of hybrid beamforming in a wireless communication system. The present invention provides a method for transmitting a control channel for hybrid beamforming. The present invention provides a method for grouping users by using beam scanning preamble-based feedback information and a method for allocating control channel resources. The present invention provides a detection method for a UE to acquire a control channel. The present invention provides a basic antenna application structure for hybrid beamforming.

In an aspect, a method for transmitting control information for hybrid beamforming by a base station in a wireless communication system is provided. The method includes grouping a plurality of user equipments (UEs) based on feedback information on an analog beam, and multiplexing and transmitting control information of UEs within each group by using a specific time-frequency resource.

In another aspect, a method for detecting a control channel by a user equipment in a wireless communication system is provided. The method includes acquiring a time-frequency resource based on a preferred beam, and detecting a control channel from the acquired time-frequency resource.

Control channel resource scheduling may be done efficiently by taking analog beam constraints in hybrid beamforming into consideration.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
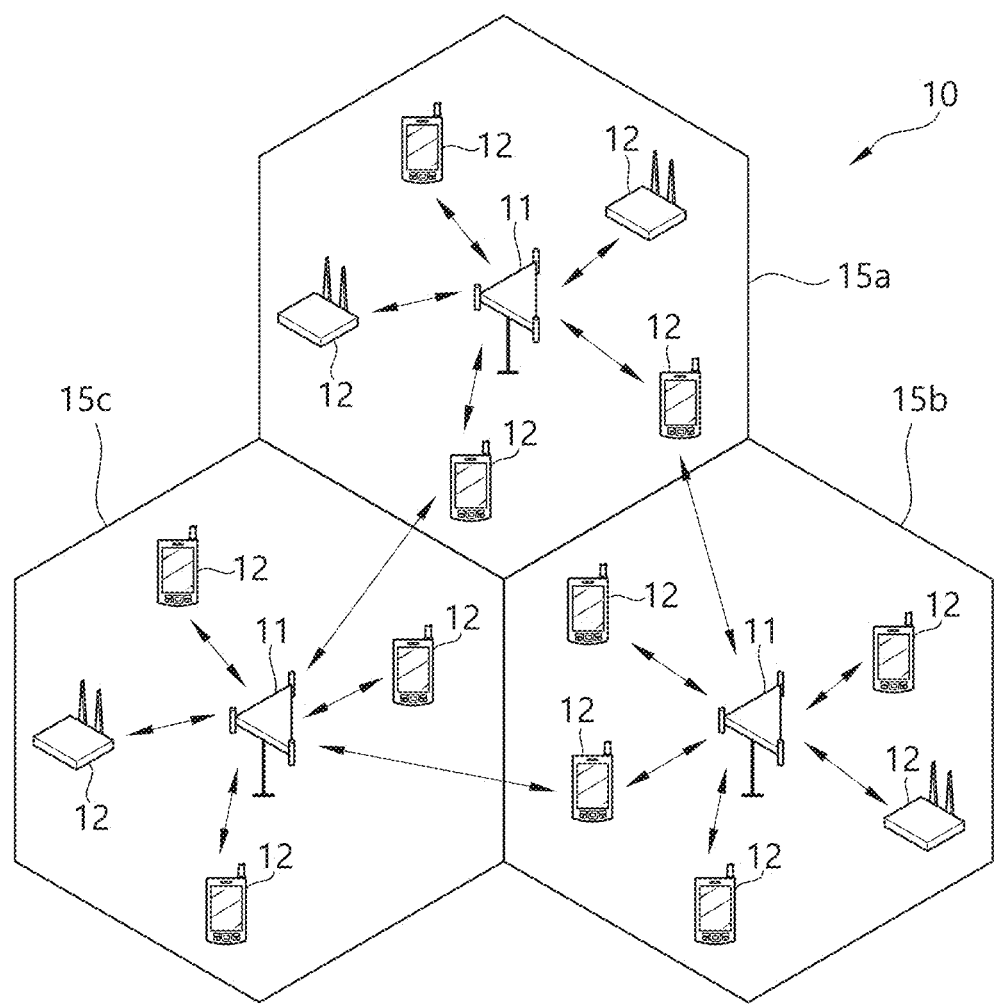
FIG. 1 shows a cellular system.

FIG. 1 shows a cellular system. Referring to FIG. 1, the cellular system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The cellular system includes a different cell adjacent to the serving cell. The different cell adjacent to the serving cell is called a neighbor cell. A BS providing a communication service to the neighbor cell is called a neighbor BS. The serving cell and the neighbor cell are relatively determined based on a UE.

This technique can be used for downlink (DL) or uplink (UL). In general, DL refers to communication from the BS 11 to the UE 12, and UL refers to communication from the UE 12 to the BS 11. In DL, a transmitter may be part of the BS 11 and a receiver may be part of the UE 12. In UL, a transmitter may be part of the UE 12 and a receiver may be part of the BS 11.

Figure 2:
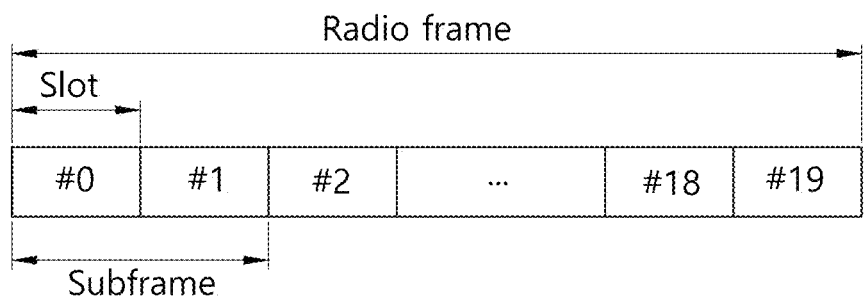
FIG. 2 shows a structure of a radio frame of 3GPP LTE.

FIG. 2 shows a structure of a radio frame of 3GPP LTE. Referring to FIG. 2, a radio frame consists of 10 subframes, and a subframe consists of two slots. Slots within the radio frame are numbered from #0 to #19. A transmission time interval (TTI) is a basic scheduling unit for data transmission. In 3GPP LTE, one TTI may be equal to the time it takes for one subframe to be transmitted. One radio frame may have a length of 10 ms, one subframe may have a length of 1 ms, and one slot may have a length of 0.5 ms.

One slot includes a plurality of orthogonal frequency division multiplexing (OFDM) symbols in time domain and a plurality of subcarriers in frequency domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners. 3GPP LTE defines one slot as 7 OFDM symbols in a normal cyclic prefix (CP) and one slot as 6 OFDM symbols in an extended CP.

The need for hybrid beamforming will be described. Beamforming technology using multiple antennas may be broadly divided into analog beamforming technology (hereinafter, "analog beamforming") and digital beamforming technology (hereinafter, "digital beamforming") depending on where a beamforming weight vector (or precoding vector) is applied.

Figure 3:
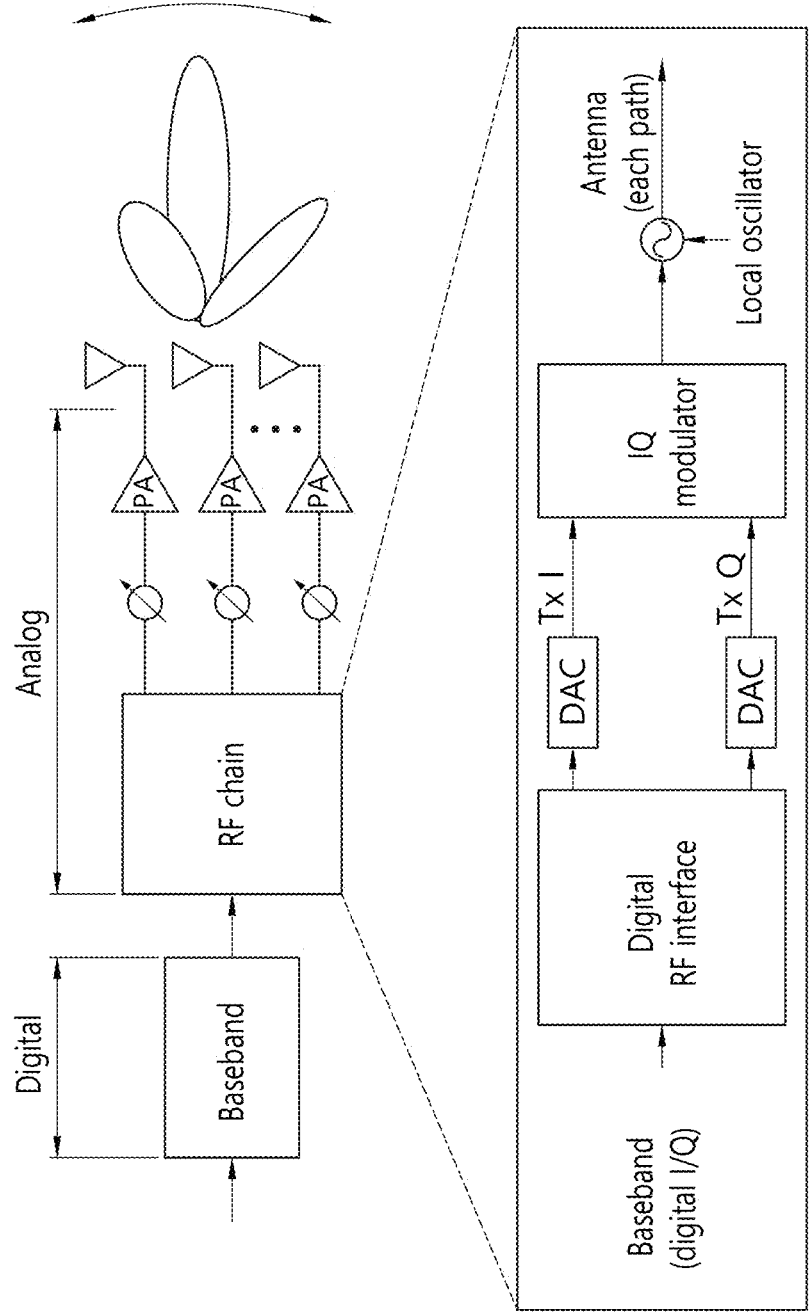
FIG. 3 is a block diagram of a transmitter including an analog beamformer and a radio frequency (RF) chain.

FIG. 3 is a block diagram of a transmitter including an analog beamformer and a radio frequency (RF) chain. Analog beamforming is a typical beamforming technique applied to earlier multi-antenna structures. In analog beamforming, a beam is formed by partitioning an analog signal, produced by digital signal processing, into a plurality of paths and configuring the phase shift (PS) and power amplifier (PA) settings for each path. Referring to FIG. 3, an analog signal derived from a single digital signal is processed by the PS and PA connected to each antenna. That is, the PS and the PA handles complex weights in the analog stage. Here, the RF chain refers to a processing block that converts a baseband signal into an analog signal. In analog beamforming, beam precision is determined by the element characteristics of the PS and PA, and the control characteristics of the element make analog beamforming advantageous for narrowband transmission. Moreover, the hardware structure makes it difficult to implement multi-stream transmission, thus making the multiplexing gain for higher data rates relatively small and making it impractical to form a beam per user based on orthogonal resource allocation.

Figure 4:
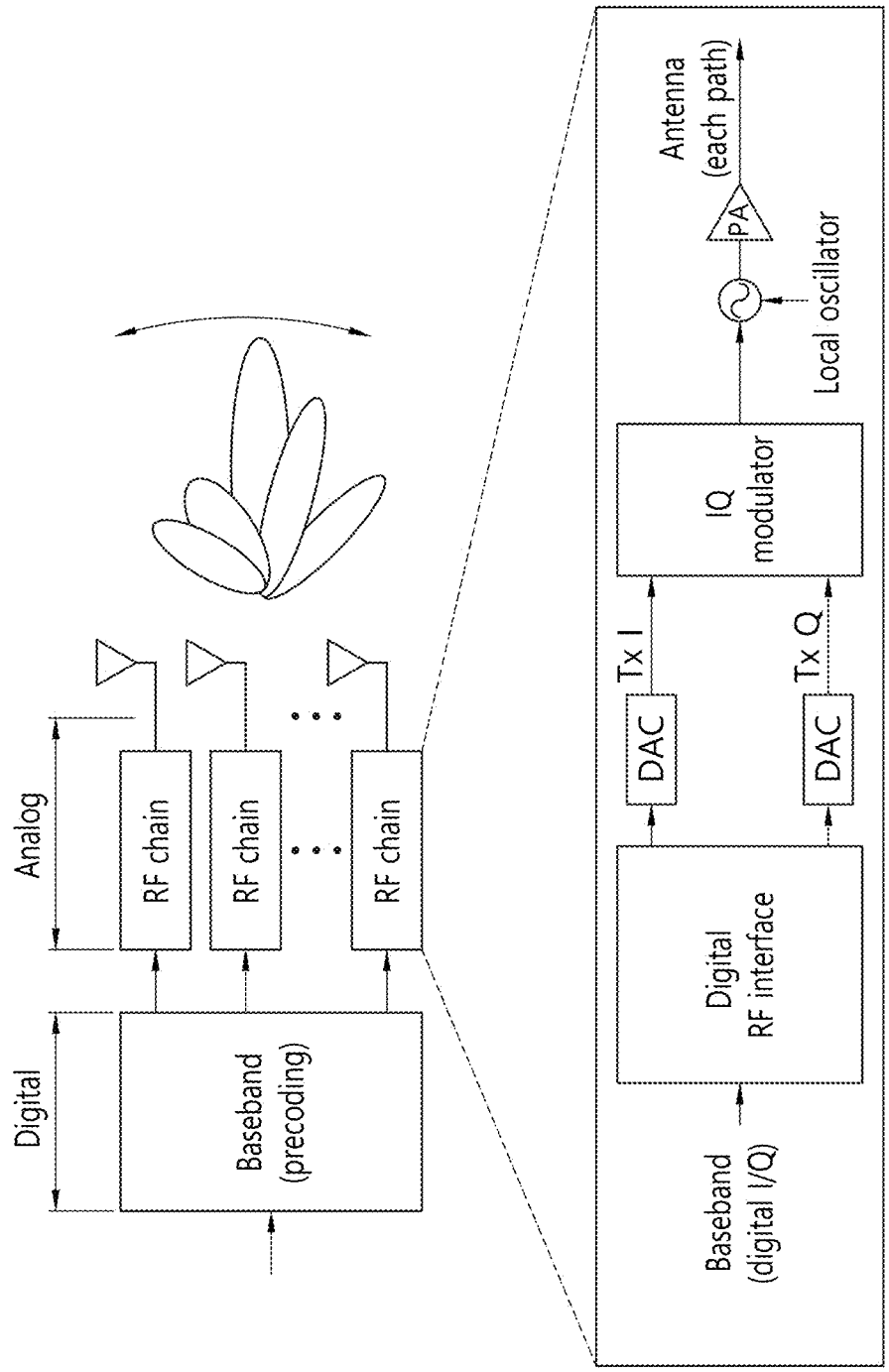
FIG. 4 is a block diagram of a transmitter including a digital beamformer and a RF chain.

FIG. 4 is a block diagram of a transmitter including a digital beamformer and a RF chain. In digital beamforming, as opposed to analog beamforming, a beam is formed in the digital stage by a baseband process, in order to maximize diversity and multiplexing gain in an MIMO environment.

Referring to FIG. 4, a beam may be formed by performing precoding in the baseband process. The RF chains may include PAs. Hence, complex weights generated for beamforming may be applied directly to transmitted data. Digital beamforming may support simultaneous multi-user beamforming because a different beam may be formed for each user. Moreover, digital beamforming allows for forming an independent beam for each user to whom a resource is orthogonally allocated, thus providing high scheduling flexibility and enabling to operate the transmitting end according to a system purpose. In digital beamforming, when a technology such as MIMO-OFDM is used in a broadband transmission environment, an independent beam may be formed per subcarrier. Thus, digital beamforming may optimize the maximum data rate of a single user on the basis of increased system capacity and greater beam gain. Therefore, digital beamforming-based MIMO technology was adopted to 3G/4G systems.

Table 1 shows the relationship between performance gain and complexity of analog beamforming and digital beamforming.

TABLE 1

|  | Ease of beamforming precision control | Multi-carrier beam control | Multi-stream transmission | Hardware complexity (BB process) | Pilot and feedback overhead |
|---|---|---|---|---|---|
| Analog beamforming | Low (related to PA/PS element characteristics) | Not available or difficult | Not available or difficult | Low | Low |
| Digital beamforming | High | Available | Available | High | High |

Meanwhile, a massive MIMO environment with a significantly increased number of transmit-receive antennas may be considered. For a typical cellular system, it is assumed that up to 8 transmit-receive antennas are used in an MIMO environment, whereas scores or even hundreds of transmit-receive antennas may be used in a massive MIMO environment. When conventional digital beamforming is used in a massive MIMO environment, digital signal processing should be performed for hundreds of transmit antennas by a baseband process. This increases the complexity of signal processing considerably, and also increases the complexity of hardware implementation considerably since as many RF chains are needed as there are transmit antennas. Moreover, independent channel estimation is needed for every transmit antenna, and a frequency division duplex (FDD) system requires feedback information for massive MIMO channels of all antennas, thus considerably increasing pilot and feedback overhead. In contrast, when conventional analog beamforming is used in a massive MIMO environment, the hardware complexity at the transmitting end is relatively low, but the performance increase through the use of multiple antennas is only slight and the flexibility of resource allocation may be reduced. Especially in broadband transmission, it is very hard to perform beam control for each frequency.

Accordingly, massive MIMO environments require hybrid beamforming, a combination of analog beamforming and digital beamforming, rather than using either analog beamforming or digital beamforming as a beamforming technology. That is, a hybrid-type transmitting end structure may be needed so as to lower the complexity of hardware implementation at the transmitting end according to the characteristics of analog beamforming and to maximize beamforming gain using a large number of transmit antennas according to the characteristics of digital beamforming.

Hybrid beamforming will be described. As described above, the purpose of hybrid beamforming is to configure a transmitting end that provides the benefits of analog beamforming and the benefits of digital beamforming in a massive MIMO environment.

Figure 5:
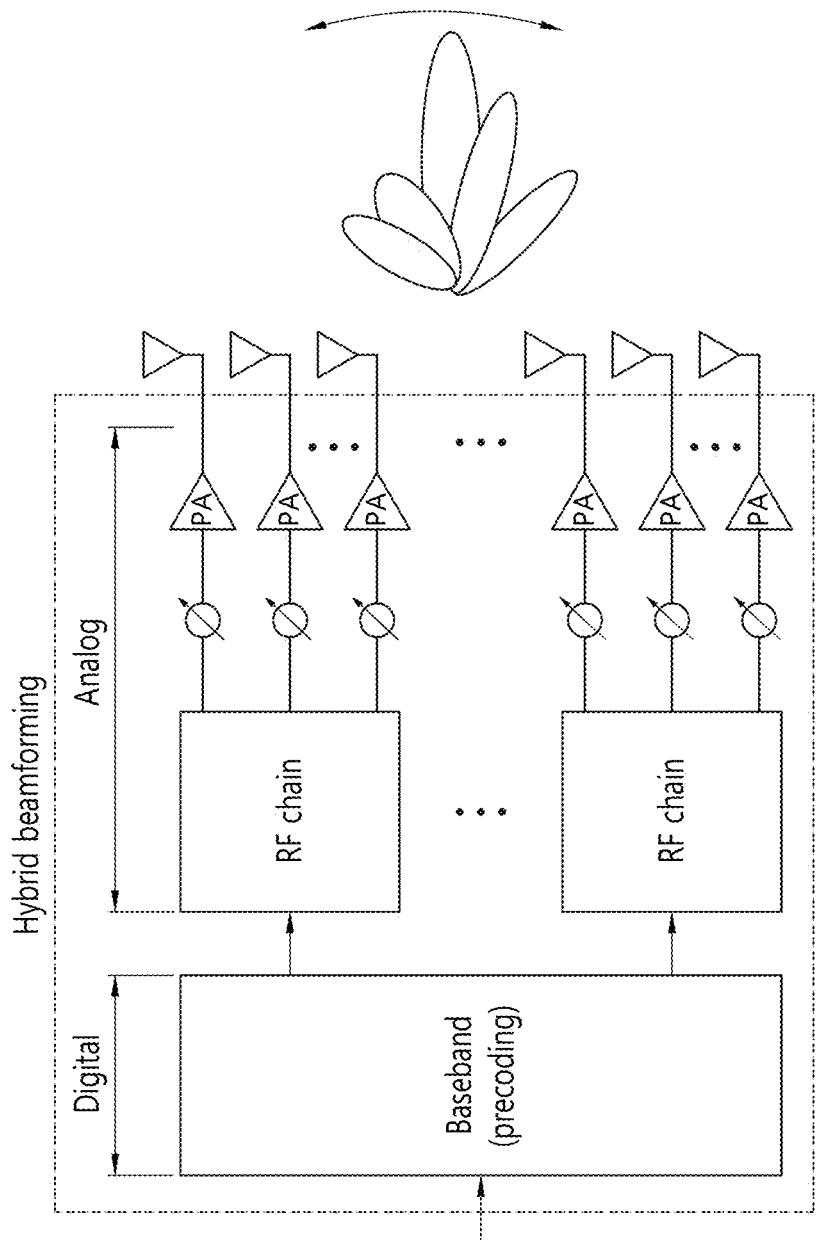
FIG. 5 is a block diagram of a transmitter including a hybrid beamformer.

FIG. 5 is a block diagram of a transmitter including a hybrid beamformer. Referring to FIG. 5, hybrid beamforming may basically allow for forming a coarse beam through analog beamforming and then a beam for multi-stream or multi-user transmission through digital beamforming. That is, hybrid beamforming exploits both analog beamforming and digital beamforming in order to lower the complexity of implementation at the transmitting end or hardware complexity.

A basic hybrid beamformer may have $N_t^{RF}$ individual transmit antennas for each RF chain. Thus, the relationship between the total number of transmit antennas and the number of transmit antennas per RF chain is expressed by $N_t = N_t^{RF} * N_{RF}$. $N_{RF}$ is the number of RF chains. Finally, signals that have passed through the PSs and PAs for each RF chain are sent independently to the transmit antennas. Equation 1 represents an example of a matrix operation-based system model of hybrid beamforming.

$$y_k = H_k F^{RF} F_k^{BB} s_k + z_k \qquad \text{<Equation 1>}$$

In Equation 1, $y_k$ is the received signal vector ($N_r*1$) at the kth subcarrier, $H_k$ is the $N_r*N_t$ channel at the kth subcarrier, $F^{RF}$ is the $N_t*N_{RF}$ RF precoder at all subcarriers (which is the same for all subcarriers), $F_k^{BB}$ is the $N_{RF}*N_s$ baseband precoder at the kth subcarrier (which may vary for each subcarrier), $s_k$ is the transmitted signal vector ($N_s*1$) at the kth subcarrier, and $z_k$ is the noise signal vector k ($N_r*1$) at the kth subcarrier. In addition, k is the subcarrier index (k=0,1,2, . . . , $N_{FFT}$–1), $N_{FFT}$ is the size of fast Fourier transform (FFT), i.e. the total number of subcarriers, and $N_{RF}$ is the total number of RF chains. $N_t$ is the total number of antennas at the transmitting end, $N_t^{RF}$ is the number of transmit antennas for each RF chain, $N_r$ is the total number of antennas at the receiving end, and $N_s$ is the number of transmitted data streams.

For subcarrier k, the above Equation 1 can be solved and expanded as in Equation 2.

$$\begin{bmatrix} y^{(1)} \\ \vdots \\ y^{(N_r)} \end{bmatrix} = \begin{bmatrix} h_{11} & h_{12} & \cdots & h_{1N_t} \\ h_{21} & h_{22} & \cdots & h_{2N_t} \\ \vdots & \vdots & \ddots & \vdots \\ h_{N_r 1} & h_{N_r 2} & \cdots & h_{N_r N_t} \end{bmatrix} \qquad \text{(Equation 2)}$$

$$F^{RF}\left(\begin{bmatrix} v_{1,1} & v_{1,2} & \cdots & v_{N_{RF},N_S} \\ v_{2,1} & v_{2,2} & \cdots & v_{N_{RF},N_S} \\ \vdots & \vdots & \ddots & \vdots \\ v_{N_{RF},1} & v_{N_{RF},2} & \cdots & v_{N_{RF},N_S} \end{bmatrix} \begin{bmatrix} x^{(1)} \\ \vdots \\ x^{(N_S-1)} \end{bmatrix}\right) +$$

$$\begin{bmatrix} z^{(1)} \\ \vdots \\ z^{(N_r)} \end{bmatrix}$$

Moreover, an equivalent precoding matrix $F^{RF}$ of analog beamforming created by the PSs and PAs after the RF chain is represented by Equation 3.

$$F^{RF} = \begin{bmatrix} w^1_{N_t^{RF}} & 0 & 0 & \cdots & 0 \\ 0 & w^2_{N_t^{RF}} & 0 & \cdots & 0 \\ 0 & 0 & w^3_{N_t^{RF}} & \cdots & 0 \\ \vdots & \vdots & \vdots & \ddots & \vdots \\ 0 & 0 & 0 & \cdots & w^{N_{RF}}_{N_t^{RF}} \end{bmatrix} \quad \langle\text{Equation 3}\rangle$$

The precoding weight for each RF chain of $F^{RF}$ is represented by Equation 4.

$$w^j_{N_t^{RF}} = \begin{bmatrix} w^j_1 \\ w^j_2 \\ \vdots \\ w^j_{N_t^{RF}} \end{bmatrix} \quad \langle\text{Equation 4}\rangle$$

A hybrid beam radiation pattern for a uniform linear array (ULA) antenna will be described. The array response vector for the ULA antenna is represented by Equation 5.

$$a(\theta) = \qquad \langle\text{Equation 5}\rangle$$
$$\begin{bmatrix} 1 & \exp\left(j2\pi \times 1 \times \frac{d}{\lambda}\sin(\theta)\right) & \exp\left(j2\pi \times 2 \times \frac{d}{\lambda}\sin(\theta)\right) & \cdots \\ & & \exp\left(j2\pi \times (N_t-1) \times \frac{d}{\lambda}\sin(\theta)\right) \end{bmatrix}^T$$

In Equation 5, $\lambda$ is wavelength, and d is the distance between antennas. To illustrate an antenna radiation pattern of the hybrid beamformer, it is assumed below that there are four RF chains and there are four transmit antennas for each RF chain, for convenience of explanation.

Figure 6:
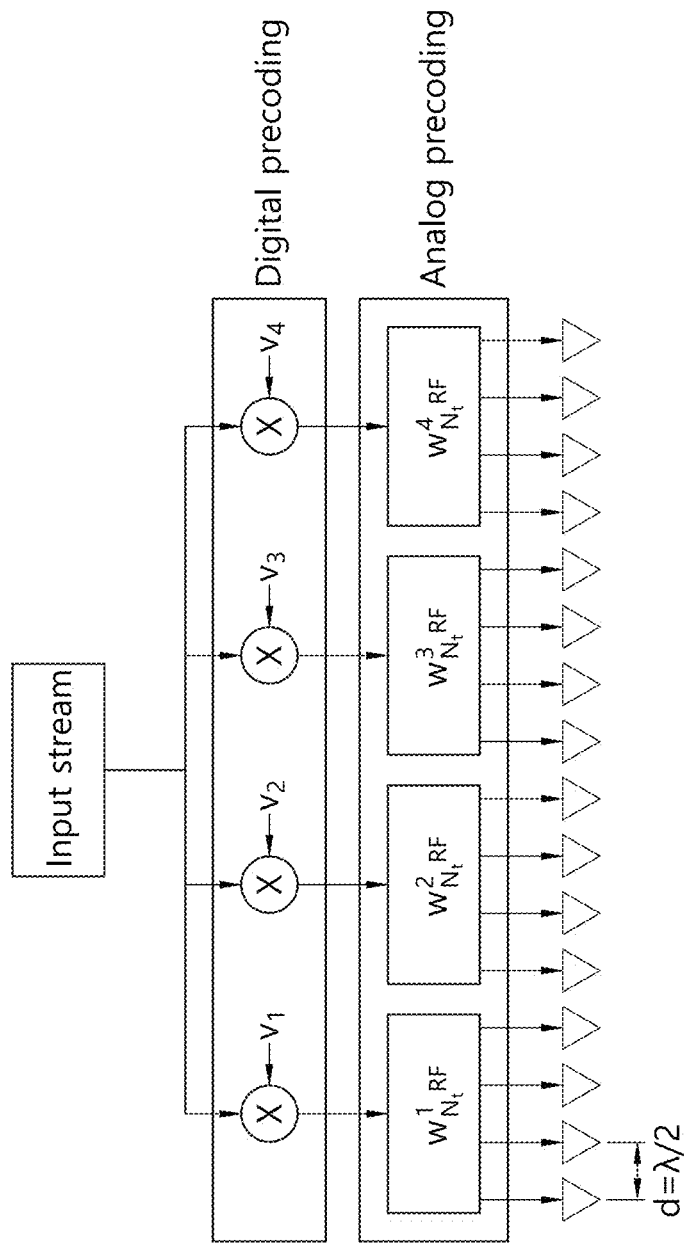
FIG. 6 shows an example of a 16 ULA antenna structure including 4 RF chains for hybrid beamforming.

FIG. 6 shows an example of a 16 ULA antenna structure including 4 RF chains for hybrid beamforming. It is assumed that $d=\lambda/2$. In this case, the equivalent precoding matrix $F^{RF}$ of analog beamforming is represented by Equation 6.

$$F^{RF} = \begin{bmatrix} w^1_{N_t^{RF}} & 0 & 0 & 0 \\ 0 & w^2_{N_t^{RF}} & 0 & 0 \\ 0 & 0 & w^3_{N_t^{RF}} & 0 \\ 0 & 0 & 0 & w^4_{N_t^{RF}} \end{bmatrix}, \quad \langle\text{Equation 6}\rangle$$

$$w^j_{N_t^{RF}} = \begin{bmatrix} w^j_1 \\ w^j_2 \\ w^j_3 \\ w^j_4 \end{bmatrix}$$

Moreover, the weight vector for a certain rank 1 to be applied in digital beamforming may be defined by Equation 7.

$$F^{BB} = v1 = [v1\, v2\, v3\, v4]^T \qquad \langle\text{Equation 7}\rangle$$

The full antenna array response vector to which the analog beamforming of Equation 6 and the digital beamforming of Equation 7 are applied may be represented by Equation 8. A response to each antenna array response may be represented by the sum of all the vector elements.

$$\sum a(\theta) = \sum_{i=0}^{15} a_i(\theta) = \qquad \langle\text{Equation 8}\rangle$$
$$(1 \cdot w_1^1 + \exp(j\pi \times \sin(\theta)) \cdot w_1^2 + \exp(j\pi 2 \times \sin(\theta)) \cdot w_1^3 +$$
$$\exp(j\pi 3 \times \sin(\theta)) \cdot w_1^4) \times v_1 +$$
$$(\exp(j\pi 4 \times \sin(\theta)) \cdot w_2^1 + \exp(j\pi 5 \times \sin(\theta)) \cdot w_2^2 +$$
$$\exp(j\pi 6 \times \sin(\theta)) \cdot w_2^3 + \exp(j\pi 7 \times \sin(\theta)) \cdot w_2^4) \times$$
$$v_2 + (\exp(j\pi 8 \times \sin(\theta)) \cdot w_3^1 + \exp(j\pi 9 \times \sin(\theta)) \cdot w_3^2 +$$
$$\exp(j\pi 10 \times \sin(\theta)) \cdot w_3^3 + \exp(j\pi 11 \times \sin(\theta)) \cdot w_3^4) \times$$
$$v_3 + (\exp(j\pi 12 \times \sin(\theta)) \cdot w_4^1 + \exp(j\pi 13 \times \sin(\theta)) \cdot w_4^2 +$$
$$\exp(j\pi 14 \times \sin(\theta)) \cdot w_4^3 +$$
$$\exp(j\pi 15 \times \sin(\theta)) \cdot w_4^4) \times v_4$$

Moreover, the analog beamforming weights may be set as in Equation 9. This is an example of a method for setting the analog beamforming weights that may be generally applied to set boresights through analog beamforming.

$$w_1^1 = \begin{bmatrix} 1 \\ e^{-j\pi\sin(\varphi)} \\ e^{-j\pi 2\sin(\varphi)} \\ e^{-j\pi 3\sin(\varphi)} \end{bmatrix} \qquad \langle\text{Equation 9}\rangle$$

$$w_2^1 = \begin{bmatrix} e^{-j\pi 4\sin(\varphi)} \\ e^{-j\pi 5\sin(\varphi)} \\ e^{-j\pi 6\sin(\varphi)} \\ e^{-j\pi 7\sin(\varphi)} \end{bmatrix} = e^{-j\pi 4\sin(\varphi)} \begin{bmatrix} 1 \\ e^{-j\pi\sin(\varphi)} \\ e^{-j\pi 2\sin(\varphi)} \\ e^{-j\pi 3\sin(\varphi)} \end{bmatrix}$$

-continued $$w_3^1 = \begin{bmatrix} e^{-j\pi 8\sin(\varphi)} \\ e^{-j\pi 9\sin(\varphi)} \\ e^{-j\pi 10\sin(\varphi)} \\ e^{-j\pi 11\sin(\varphi)} \end{bmatrix} = e^{-j\pi 8\sin(\varphi)} \begin{bmatrix} 1 \\ e^{-j\pi\sin(\varphi)} \\ e^{-j\pi 2\sin(\varphi)} \\ e^{-j\pi 3\sin(\varphi)} \end{bmatrix}$$

$$w_4^1 = \begin{bmatrix} e^{-j\pi 12\sin(\varphi)} \\ e^{-j\pi 13\sin(\varphi)} \\ e^{-j\pi 14\sin(\varphi)} \\ e^{-j\pi 15\sin(\varphi)} \end{bmatrix} = e^{-j\pi 12\sin(\varphi)} \begin{bmatrix} 1 \\ e^{-j\pi\sin(\varphi)} \\ e^{-j\pi 2\sin(\varphi)} \\ e^{-j\pi 3\sin(\varphi)} \end{bmatrix}$$

Using Equation 9, Equation 8 can be summarized and generalized, as represented by Equation 10:

$$\sum a(\theta) = (1 + \exp(j\pi[\sin(\theta) - \sin(\varphi)]) + \quad \langle \text{Equation 10}\rangle$$
$$\ldots + \exp(j\pi(N_t^{RF} - 1) \cdot [\sin(\theta) - \sin(\varphi)])) \times$$
$$(v_1 + \exp(j\pi \cdot (N_t^{RF}) \cdot [\sin(\theta) - \sin(\varphi)]) \cdot v_2 + \ldots +$$
$$\exp(j\pi \cdot [N_t^{RF} \cdot (N_{RF} - 1)] \cdot [\sin(\theta) - \sin(\varphi)]) \cdot$$
$$v_{N_{RF}}) = \left(\sum_{i=1}^{N_t^{RF}} s_i\right) \times \left(\sum_{i=1}^{N_{RF}} t_i\right) = \sum s \times \sum t$$

In Equation 10,φ represents the angle of degrees which determines analog beamforming. For φ=30° or π/6, for example, the beamforming direction is set such that the beam gain is maximum at θ=30° or π/6. Moreover, the beam bound vector s determines the entire effective area of hybrid beamforming, and the range of digital beamforming is also restricted to that area.

Figure 7:
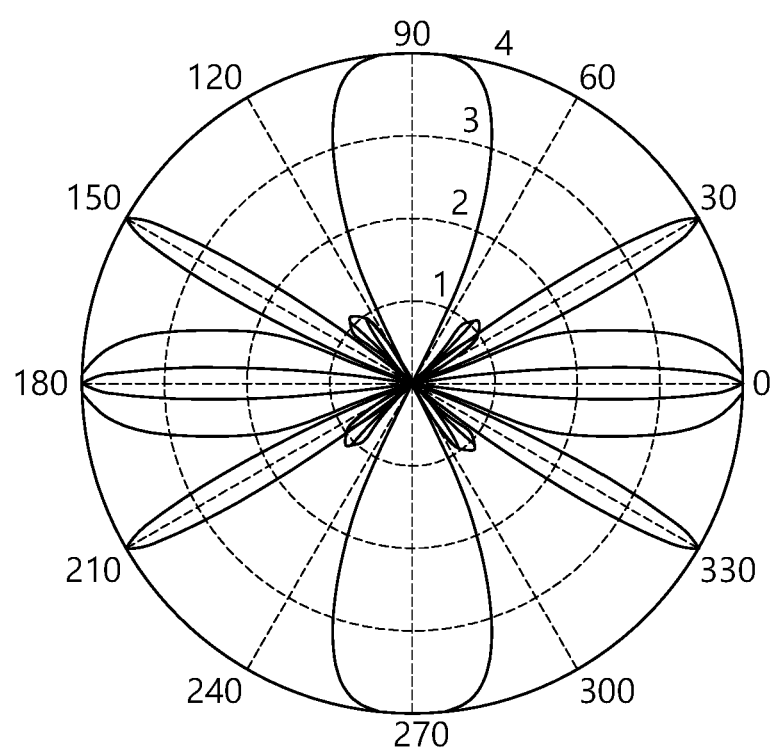
FIG. 7 shows an example of a beam pattern of the beam bound vector s, beam gain, and steering vector t.
Figure 8:
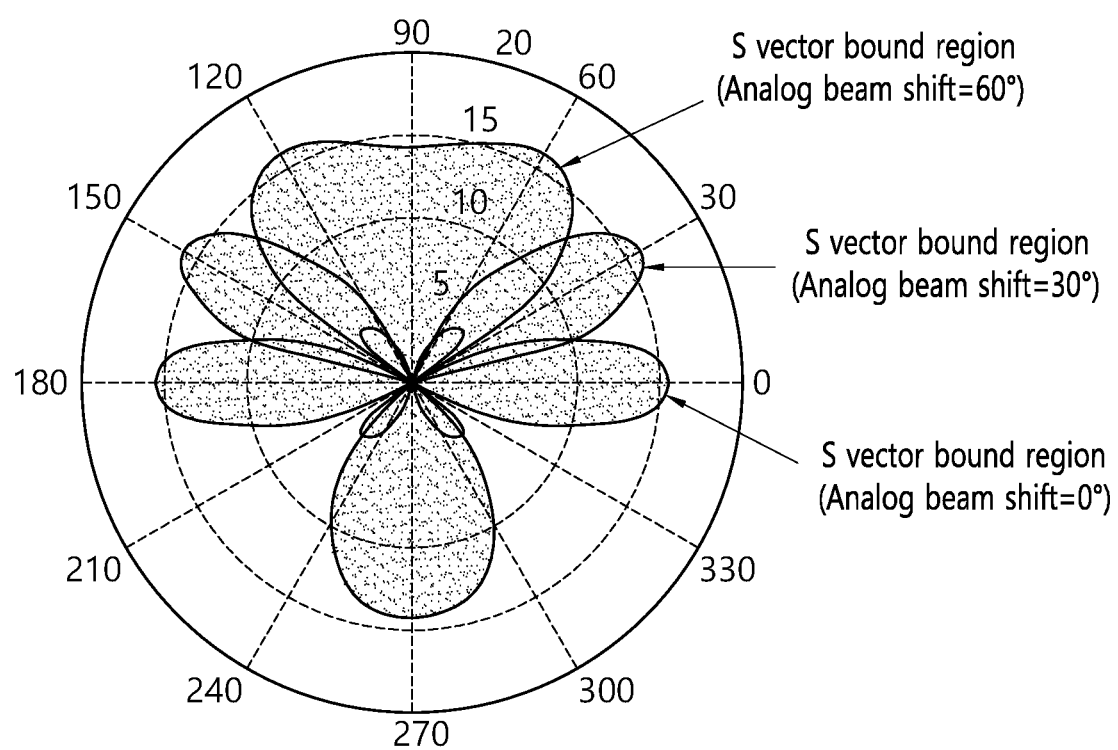
FIG. 8 shows an example of a final antenna array response according to analog beam shifts.

FIG. 7 shows an example of a beam pattern of the beam bound vector s, beam gain, and steering vector t. FIG. 8 shows an example of a final antenna array response according to analog beam shifts. That is, FIG. 8 is the resulting of cumulative beam pattern to which all weight vectors for determining digital beamforming are applied. Referring to FIG. 8, it can be seen that the range of an effective beam is limited by the beam bound vector s.

Technical issues with hybrid beamforming are as follows.

(1) Difficulties in optimizing analog/digital beamforming designs: While digital beamforming allows for forming individual beams for different users using the same time-frequency resource, analog beamforming is limited in that a common beam has to be formed using the same time-frequency resource. This limitation may cause issues like a limit on the largest possible number of ranks corresponding to the number of RF chains, the difficulty of subband beam control using an RF beamformer, and/or the difficulty of optimization of beamforming resolution/granularity.

(2) Need for a specific method of common signal transmission: In analog beamforming, which forms a beam only in a particular direction on the same time-frequency resource, it is not possible to form multiple beams simultaneously in the directions of all UEs. Thus, DL/UL control channels, reference signals, broadcast channels, synchronization signals, etc., may not be transmitted simultaneously to all UEs that may be distributed over all areas in a cell. There are also problems which occur when a UE transmits physical random access channel (PRACH), physical uplink control channel (PUCCH), and/or sounding RS (SRS) over UL.

(3) Need for the design of more pilots and feedback to determine an analog/digital beam: In the case of estimation for analog/digital beams, the digital beam may be estimated directly by using a conventional orthogonal pilot allocation scheme, whereas the analog beam requires as long a time-duration as the number of beam candidates. This means that the more time delay is needed for analog beam estimation, and this may cause a system loss. Moreover, simultaneously estimating both digital and analog beams may lead to a considerable increase in complexity.

(4) Difficulties in supporting analog beam-based spatial division multiple access (SDMA) and FDMA: Digital beamforming allows to freely form beams for multi-users/streams, whereas, in analog beamforming, the same beam is formed for the entire transmission band, making it difficult to form an independent beam per user or per stream. In particular, it is hard to support FDMA (e.g. OFDMA) through orthogonal frequency resource allocation, thus making the optimization of frequency resource efficiency impractical.

The present invention may provide a method of solving the complexity of analog/digital beam estimation, among the above-described technical issues with hybrid beamforming.

A method for transmitting dedicated control channels for a plurality of UEs in hybrid beamforming, in consideration of the characteristics of analog beamforming, according to an exemplary embodiment of the present invention will be described below. In hybrid beamforming, unlike digital beamforming, there may be limitations in forming individual beams for all UEs with the same frequency-time resource depending on the method of antenna configuration (i.e. method of analog beamforming configuration). Therefore, a method for transmitting dedicated control channels in groups on the basis of UEs' feedback information on analog beams may be proposed according to an exemplary embodiment of the present invention.

First, according to an exemplary embodiment of the present invention, a method in which a base station groups UEs based on feedback information on an analog beam and multiplexes and transmits control information of UEs within each group on a specific time-frequency resource is described. Considering that a final beam, which is formed by hybrid beamforming in the time domain and the entire frequency band during beamforming, is limited to within a particular area, due to the characteristics of analog beams, the base station may group UEs by area based on the UEs' feedback information on an analog beam. Analog beam and sector beam below may be hereinafter used by being mixed.

Figure 9:
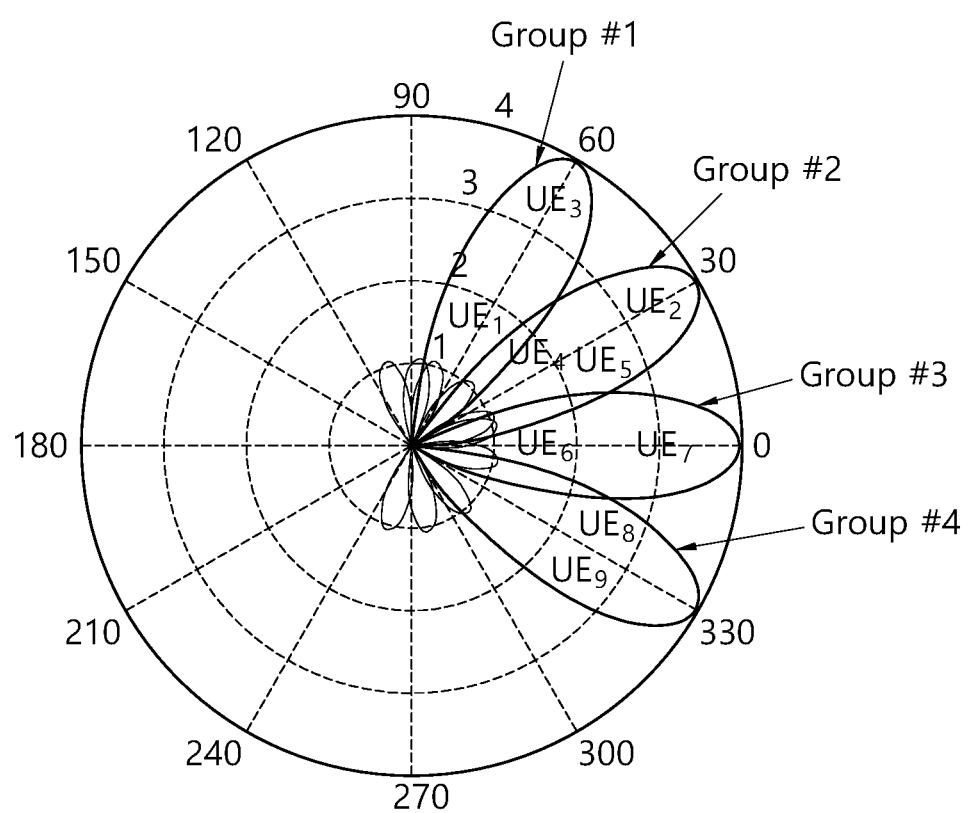
FIG. 9 shows an example of grouping UEs by analog beam patterns according to an exemplary embodiment of the present invention.

FIG. 9 shows an example of grouping UEs by analog beam patterns according to an exemplary embodiment of the present invention. Referring to FIG. 9, a plurality of UEs are distributed within service coverage, and UEs located within each analog beam may be grouped in one group. Table 2 shows the grouping of UEs for each analog beam.

TABLE 2

| Sector beam index (Analog beam index) | Group | UE | PMI candidates |
|---|---|---|---|
| Beam #1 | Group #1 | UE1 UE3 | {P1, P2} |
| Beam #2 | Group #2 | UE2 UE4 UE5 | {P3, P4, P5} |
| Beam #3 | Group #3 | UE6 UE7 | {P6, P7} |

TABLE 2-continued

| Sector beam index (Analog beam index) | Group | UE | PMI candidates |
|---|---|---|---|
| Beam #4 | Group #4 | UE8 UE9 | {P8, P9} |

Referring to Table 2, UE1 and UE3 located within the pattern of analog beam #1 are grouped as group #1, UE2, UE4, and UE5 located within the pattern of analog beam #2 are grouped as group #2, UE6 and UE7 located within the pattern of analog beam #3 are grouped as group #3, and UE8 and UE9 located within the pattern of analog beam #4 are grouped as group #4.

After grouping UEs by area, the base station may multiplex dedicated control channels for UEs per each group and transmit them simultaneously. A concrete method of multiplexing dedicated control channels will be described later. Various concrete methods for grouping UEs according to an exemplary embodiment of the present invention will be described below.

(1) The base station may group UEs by taking into account the width of an analog beam and/or digital beam, with respect to a UE with the lowest signal quality. For grouping UEs, the base station may adjust analog beams with respect to a UE which is farthest from the base station or has the lowest signal quality. That is, an existing predefined analog beam may be shifted for UE grouping.

Figure 10:
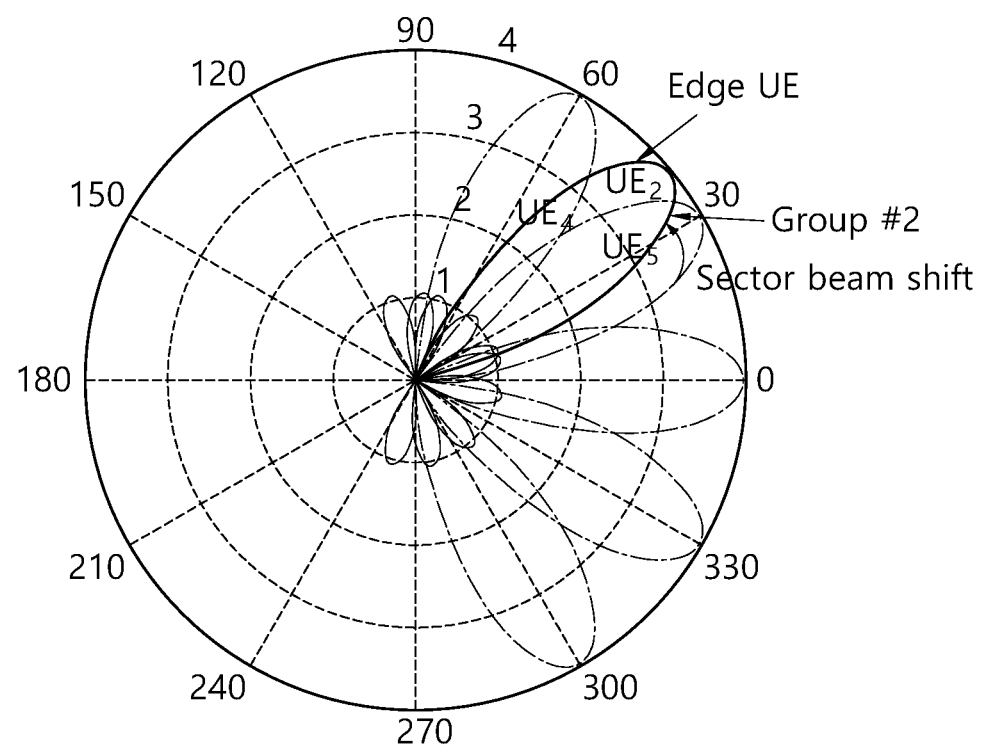
FIG. 10 shows an example of UE grouping according to an exemplary embodiment of the present invention.

FIG. 10 shows an example of UE grouping according to an exemplary embodiment of the present invention. Referring to FIG. 10, UE2, UE4, and UE5 located within an analog beam with θ=30° are grouped as group #2, and UE2 corresponds to an edge UE on the edge of the coverage of the base station. It is assumed that the weight vector for analog beamforming is defined by Equation 11.

$$w_{N_t^{RF}} = \begin{bmatrix} 1 \\ e^{j\pi \sin(\theta)} \\ e^{j\pi 2\sin(\theta)} \\ e^{j\pi 3\sin(\theta)} \end{bmatrix} \quad \langle\text{Equation 11}\rangle$$

Moreover, it is assumed that θ is predefined as 0°, ±30°, and ±60°. In this case, an analog beam with θ=30° may be shifted by +5° for UE grouping. Accordingly, the edge UE (i.e. UE2), which requires the largest beamforming gain, may be grouped appropriately.

(2) The base station may group UEs by taking into account the width of an analog beam and/or digital beam, with respect to a UE with the highest signal quality. For grouping UEs, the base station may adjust analog beams with respect to a UE which is closest to the base station or has the best signal quality.

(3) The base station may group UEs by taking into account the width of an analog beam and/or digital beam, with respect to a UE with the average signal quality. That is, UEs may be grouped according to the location where each analog beam is formed. For example, when an analog beam is formed in a vertical direction, UEs may be grouped in the vertical direction, and when an analog beam is formed in a horizontal direction, UEs may be grouped in the horizontal direction.

A method for multiplexing dedicated control channels for UEs grouped per each analog beam according to another exemplary embodiment of the present invention will be described below. As described above, since beams with limited coverage are formed at the same time by hybrid beamforming, control channels for UEs grouped by analog beam patterns need to be transmitted in association with the analog beams.

Figure 11:
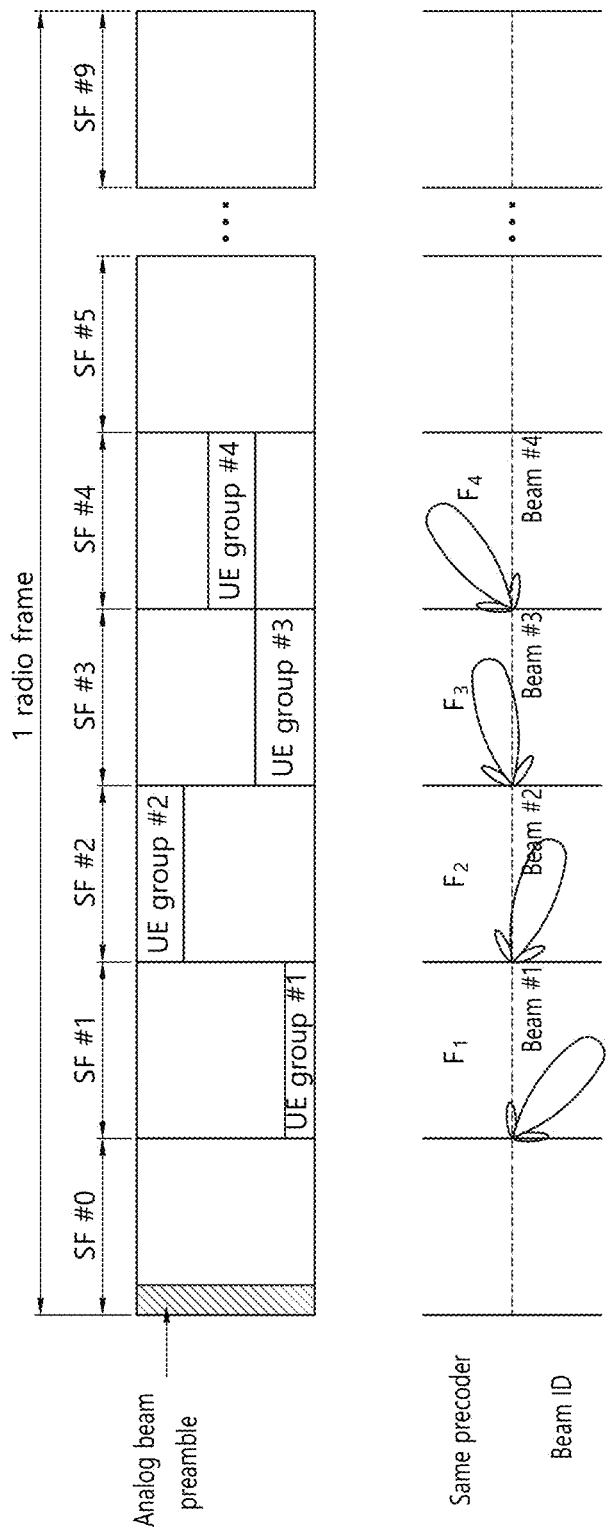
FIG. 11 shows an example of control channel multiplexing according to an exemplary embodiment of the present invention.

FIG. 11 shows an example of control channel multiplexing according to an exemplary embodiment of the present invention. Referring to FIG. 11, control channels for UEs in a group by an analog beam are allocated to a specific subframe or time-frequency resource associated with the analog beam. Control channel for UEs in group #1 corresponding to analog beam #1 are transmitted in subframe #1. Control channels for UEs in group #2 corresponding to analog beam #2 are transmitted in subframe #2. Control channel for UEs in group #3 corresponding to analog beam #3 are transmitted in subframe #3. Control channel for UEs in group #4 corresponding to analog beam #4 are transmitted in subframe #4. Due to the characteristics of hybrid beamforming, the base station forms only a single analog beam at a specific time. Thus, all control channels should be transmitted to all UEs in subframes #1 to #4. Therefore, dedicated control channels need to be transmitted in scheduling units of each system frame.

(1) Because a UE feeds the index (or ID) of an analog beam back to the base station, the base station may predefine control channel allocation information for each group based on the analog beam index. For example, as in Table 3, control channels may be allocated to a specific time resource (e.g. subframe), a specific frequency resource (e.g. frequency band or subband), or a specific time-frequency resource, based on the grouping of UEs according to analog beam pattern.

TABLE 3

| Sector beam index (Analog beam index) | Group | Allocation of individual time resources (Case-1) | Allocation of individual frequency resources (Case-2) | Allocation of time-frequency resources (Case-3) |
|---|---|---|---|---|
| Beam #1 | Group #1 | (SF#1, SB#1) | (SF#1, SB#1) | (SF#1, SB#1) |
| Beam #2 | Group #2 | (SF#2, SB#1) | (SF#1, SB#2) | (SF#2, SB#2) |
| Beam #3 | Group #3 | (SF#3, SB#1) | (SF#1, SB#3) | (SF#3, SB#3) |
| ... | ... | ... | ... | ... |

Referring to Table 3, SF#i represents a subframe index, and SB#i represents the start index of a subband or resource block. Analog beam #1 corresponds to group #1, analog beam #2 corresponds to group #2, and analog beam #3 corresponds to group #3. Control channels for UEs in each group may be multiplexed and transmitted.

When the multiplex control channel for each group is allocated to and transmitted on an individual time resource (Case-1), the multiplex control channels for group #1, group #2, and group #3 are transmitted over different time resources (SF#1, SF#2, and SF#3) and the same frequency resource (SB#1). When the multiplex control channel for each group is allocated to and transmitted on an individual frequency resource (Case-2), the multiplex control channels for group #1, group #2, and group #3 are transmitted over different frequency resources (SB#1, SB#2, and SB#3) and the same time resource (SF#1). When the multiplex control channel for each group is allocated to and transmitted on an individual time-frequency resource (Case-3), the multiplex control channels for group #1, group #2, and group #3 are transmitted over different time-frequency resources (SF#1/SB#1, SF#2/SB#2, and SF#3/SB#3). Meanwhile, the subframe indices or subband indices indicate the starting positions of the multiplex control channels, and their value may vary depending on the number of multiplexed UEs in each group.

Figure 12:
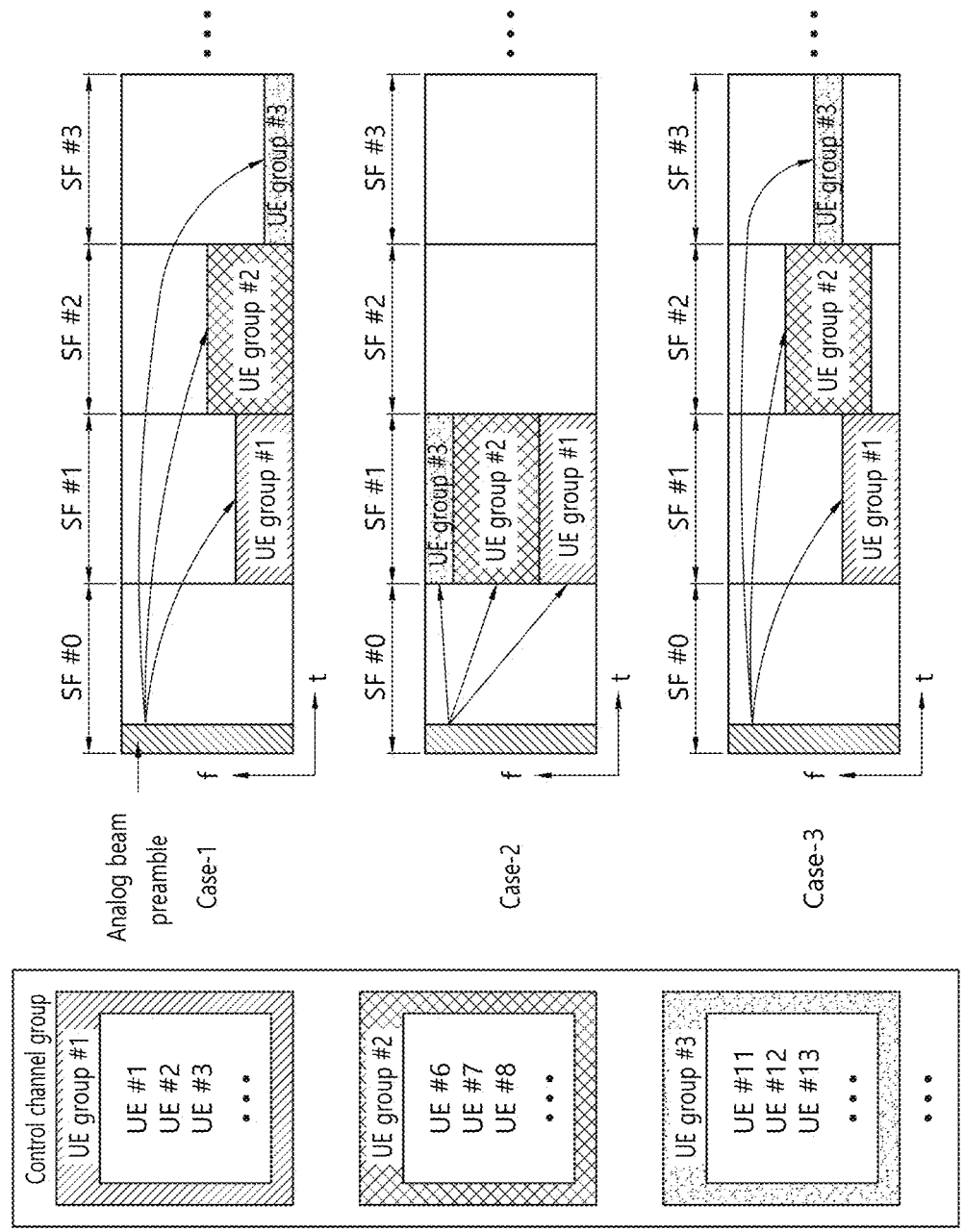
FIG. 12 shows another example of control channel multiplexing according to an exemplary embodiment of the present invention.

FIG. 12 shows another example of control channel multiplexing according to an exemplary embodiment of the present invention. FIG. 12 schematically illustrates that multiplex control channels for different groups are allocated to and transmitted on specific time resources, specific frequency resources, or specific time-frequency resources according to the above Table 3.

In an example, when beamforming is performed in a vertical direction via analog antennas, time-frequency resources may be allocated in sequence along the vertical direction. That is, since analog beams constraints are present only in the vertical direction, control channels should be allocated by group so that the same beamforming is not applied to any of the time-frequency resources. For example, in a transmit antenna structure which cannot generate vertical beams simultaneously in multiple directions, control channels for different groups may be allocated to individual time resources or time-frequency resources, as in the above Case-1 or Case-3. In contrast, in a case where vertical beams can be generated in multiple directions at the same time, control channels for different groups may be allocated to individual frequency resources, as in the above Case-2.

Figure 13:
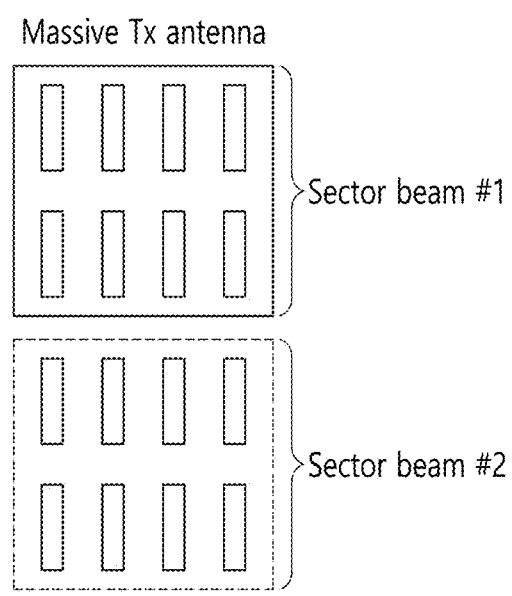
FIG. 13 shows an example of an antenna structure that allows simultaneous formation of multiple analog beams in a vertical direction according to an exemplary embodiment of the present invention.

FIG. 13 shows an example of an antenna structure that allows simultaneous formation of multiple analog beams in a vertical direction according to an exemplary embodiment of the present invention. As described above, in a case where multiple analog beams can be formed in a vertical direction at the same time, control channels for different groups may be allocated to individual time resources, individual frequency resources, or time-frequency resources.

In another example, when beamforming is performed in a horizontal direction via analog antennas, time-frequency resources may be allocated in sequence along the horizontal direction. That is, since beam constraints on analog beams are present only in the horizontal direction, control channels should be allocated by group so that the same beamforming is not applied to any of the time-frequency resources. For example, in a transmit antenna structure which cannot generate horizontal beams simultaneously in multiple directions, control channels for different groups may be allocated to individual time resources or time-frequency resources, as in the above Case-1 or Case-3. In contrast, in a case where horizontal beams can be generated in multiple directions at the same time, control channels for different groups may be allocated to individual frequency resources, as in the above Case-2.

Figure 14:
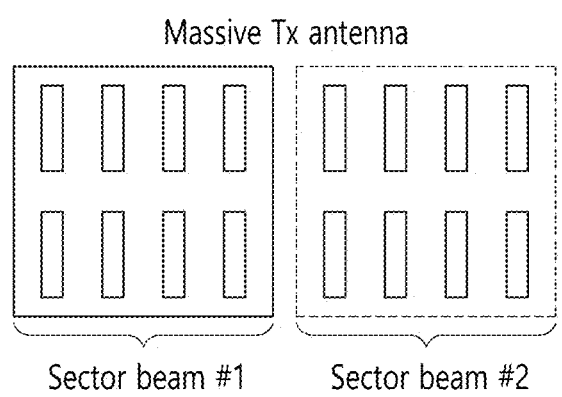
FIG. 14 shows an example of an antenna structure that allows formation of multiple analog beams in a horizontal direction at the same time according to an exemplary embodiment of the present invention.

FIG. 14 shows an example of an antenna structure that allows formation of multiple analog beams in a horizontal direction at the same time according to an exemplary embodiment of the present invention. As described above, in a case where multiple analog beams can be formed in a horizontal direction at the same time, control channels for different groups may be allocated to individual time resources, individual frequency resources, or time-frequency resources.

(2) Control channels for a plurality of UEs within a group may be multiplexed orthogonally to a time resource or frequency resource. Multiplexing of control channels for UEs in a group does not mean multiplexing of every control channel within a specific area. That is, control channels for a plurality of UEs within a group may be separately allocated by the allocation of individual resources in the frequency domain.

Figure 15:
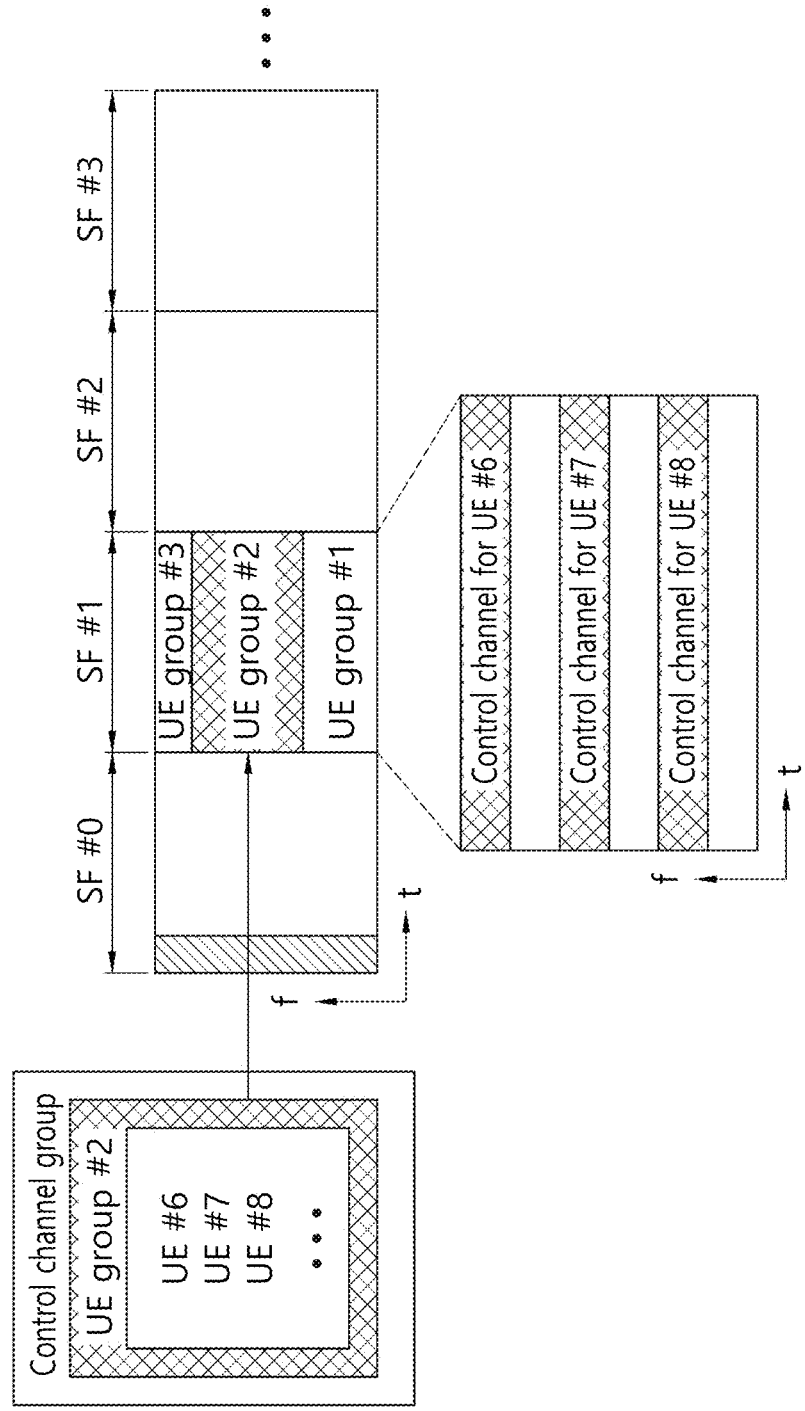
FIG. 15 shows another example of control channel multiplexing according to an exemplary embodiment of the present invention.

FIG. 15 shows another example of control channel multiplexing according to an exemplary embodiment of the present invention. Referring to FIG. 15, control channels for UEs (UE6, UE7, and UE8) within group #2 are allocated to subframe #1, and control channels for different UEs are separately allocated over individual resources in the frequency domain.

Figure 16:
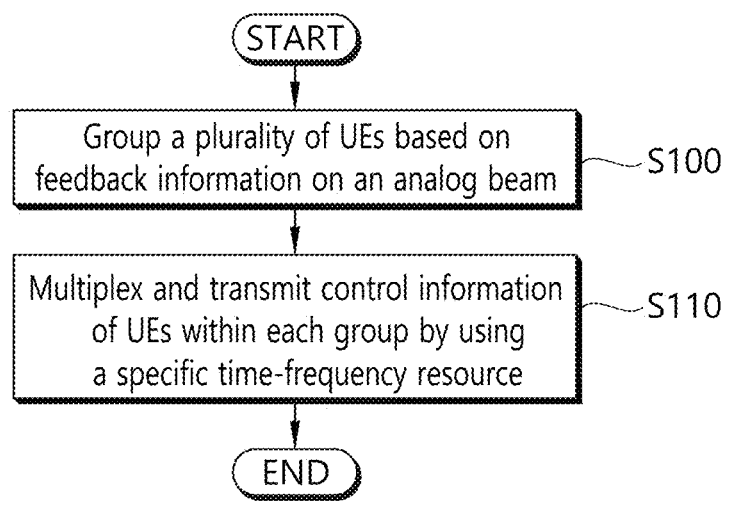
FIG. 16 shows a method for transmitting control information for hybrid beamforming according to an exemplary embodiment of the present invention.

FIG. 16 shows a method for transmitting control information for hybrid beamforming according to an exemplary embodiment of the present invention.

Referring to FIG. 16, in step S100, the base station groups a plurality of UEs based on feedback information on an analog beam. The plurality of UEs may be grouped based on the feedback information on the analog beam, with respect to a UE with the lowest signal quality. Alternatively, the plurality of UEs may be grouped based on the feedback information on the analog beam, with respect to a UE with the highest signal quality. Alternatively, the plurality of UEs may be grouped based on the feedback information on the analog beam, with respect to a UE with the average signal quality. The grouping of the plurality of UEs may include shifting a specific analog beam with respect to a specific UE. The specific UE may be either the UE with the lowest signal quality, the UE with the highest signal quality, or the UE with the average signal quality. Alternatively, the plurality of UEs may be grouped in a horizontal direction or vertical direction. The feedback information on the analog beam may be the ID or index of the analog beam. The feedback information on the analog beam may be received from the plurality of UEs.

In step S110, the base station may multiplex control information of UEs within each group and transmit them by using a specific time-frequency resource. The control information of UEs within each group may be multiplexed for each analog beam. The specific time-frequency resource for the control information of UEs within each group may be predefined for each analog beam. The specific time-frequency resource for each group may correspond to a different time resource and the same frequency resource, or a different frequency resource and the same time resource, or a different time resource and a different frequency resource. When beamforming is performed in a particular direction by the analog beam, the specific time-frequency resource for each group may correspond to a different time resource and the same frequency resource, or a different time resource and a different frequency resource. Alternatively, the control information of UEs within each group may be multiplexed orthogonally.

Moreover, the above-described examples of FIGS. 9 to 15 according to an exemplary embodiment of the present invention and the description of them may be applied to the example of FIG. 16.

A method for a UE to detect its own control channel according to an exemplary embodiment of the present invention will be described. A UE may perform detection on the basis of its preferred sector beam when detecting its own control channel from multiplexed control channels per each group. That is, the UE may detect a time resource (i.e. subframe) or time-frequency resource first on the basis of its preferred sector beam, in order to detect its own control channel. Since control channels for each group are multiplexed on the basis of the ID or index of a sector beam about which the UE has sent feedback, the preferred sector beam may be selected in two ways. That is, the preferred sector beam ID or feedback sector beam ID of the corresponding system frame may be used.

Figure 17:
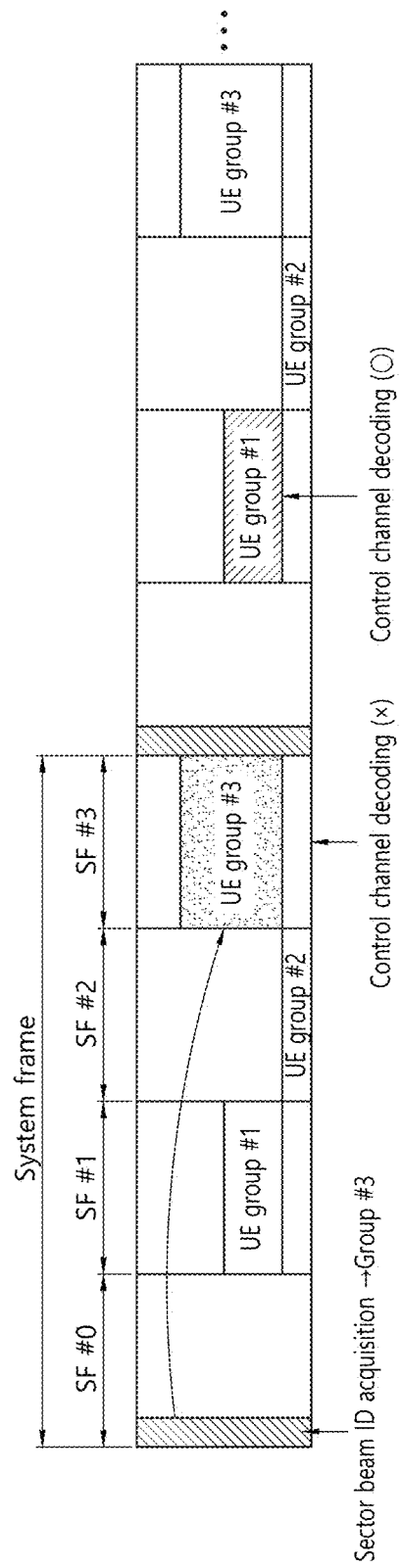
FIG. 17 shows an example of a method for detecting a control channel on the basis of a preferred sector beam by using a preamble according to an exemplary embodiment of the present invention.

FIG. 17 shows an example of a method for detecting a control channel on the basis of a preferred sector beam by using a preamble according to an exemplary embodiment of the present invention. Referring to FIG. 17, a UE may first acquire a frame configuration for transmitting dedicated control channels in the corresponding system frame. For example, if the frame configuration for transmitting dedicated control channels has a value of '0111', the control channels may be transmitted in subframes #1, #2, and #3. The UE may detect a preferred beam through an analog beam preamble of the corresponding system frame. In the example of FIG. 17, it is assumed that beam #3 is preferred through the analog beam preamble. The UE may detect its own control channel in the subframe aligned with the preferred sector beam. That is, the UE may try to detect the control channel in subframe #3 corresponding to beam #3, i.e. the preferred beam. If the UE fails to detect its control channel, it may try to detect the control channel in the subframe aligned with the preferred sector beam about which the UE has sent feedback in the previous period. For example, if information on the sector beam fed back in the previous period is information on beam #1, the UE may try to detect the control channel in subframe #1 corresponding to beam #1.

Figure 18:
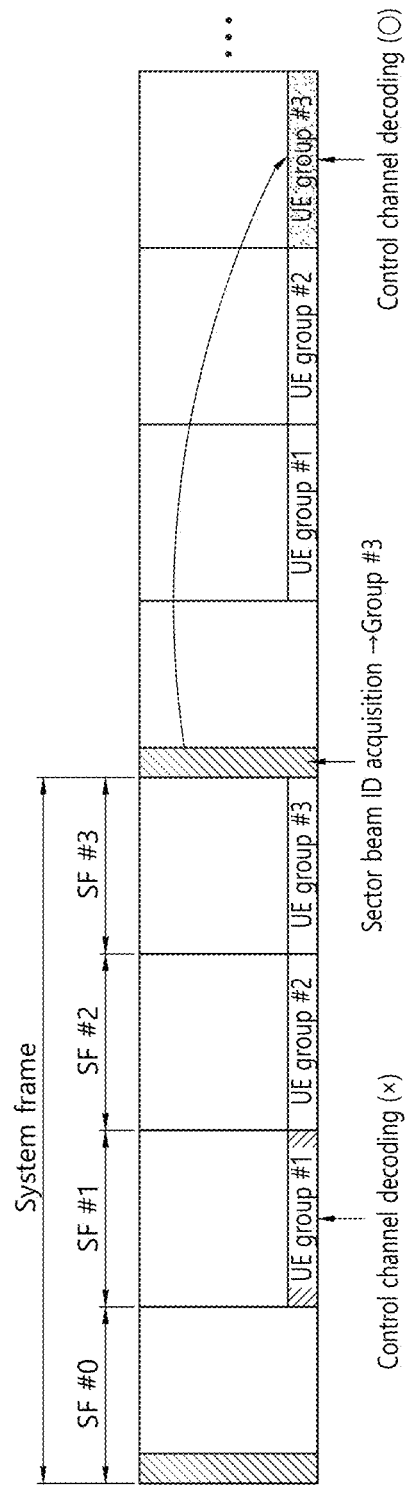
FIG. 18 shows an example of a method for detecting a control channel on the basis of a preferred sector beam that has been fed back in the previous period according to an exemplary embodiment of the present invention.

FIG. 18 shows an example of a method for detecting a control channel on the basis of a preferred sector beam that has been fed back in the previous period according to an exemplary embodiment of the present invention. Referring to FIG. 18, a UE may first acquire a frame configuration for transmitting dedicated control channels in the corresponding system frame. For example, if the frame configuration for transmitting dedicated control channels has a value of '0111', the control channels may be transmitted in subframes #1, #2, and #3. The UE may try to detect the control channel in the subframe aligned for the preferred sector beam that has been fed back in the previous period. For example, if information on the sector beam that has been fed back in the previous period is information on beam #1, the UE may try to detect the control channel in subframe #1 corresponding to beam #1. If the UE fails to detect its control channel, the UE may detect a preferred beam through an analog beam preamble of the corresponding system frame. In the example of FIG. 18, it is assumed that beam #3 is preferred through the analog beam preamble. The UE may detect its own control channel in the subframe aligned for the preferred sector beam. That is, the UE may try to detect the control channel in subframe #3 corresponding to beam #3, i.e., the preferred beam.

Generally, UE/control channel grouping and resource allocation may vary with changes in the movement or channel of a UE. In this case, the UE may detect its control information by blind decoding, even if the UE does not immediately acquire UE grouping information updated by the base station. However, this may lead to too large a number of blind decoding attempts, thereby delaying the detection and increasing the detection complexity. Therefore, the UE may detect the control channel from the next control channel group, on the basis of the sector ID determined as described above.

Figure 19:
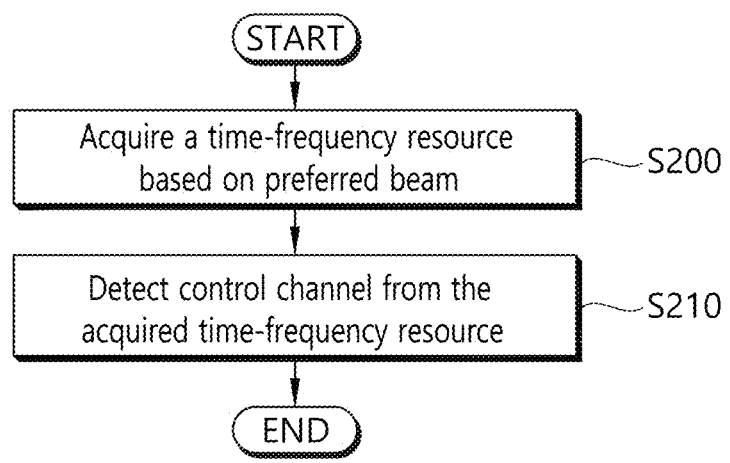
FIG. 19 shows an example of a method for detecting a control channel according to an exemplary embodiment of the present invention.

FIG. 19 shows an example of a method for detecting a control channel according to an exemplary embodiment of the present invention.

In step S200, a UE may acquire a time-frequency resource based on its preferred beam. The preferred beam may be detected based on an analog beam preamble of a system frame. Alternatively, the preferred beam may be detected based on information on the preferred beam that has been fed back in the previous period. The time-frequency resource may be a specific subframe aligned with the preferred beam. The UE may acquire a frame configuration for transmitting control channels in the system frame.

In step S210, the UE detects its own control channel from the acquired time-frequency resource.

Moreover, the above-described examples of FIGS. 17 and 18 according to an exemplary embodiment of the present invention and the description of them may be applied to the example of FIG. 19.

While the above proposal of this invention has been made with respect to a hybrid beamforming structure, the present invention is not limited to this structure. For example, the present invention may also be applied when the analog beamforming stage of FIG. 6 is replaced by a digital beamforming stage. That is, the present invention may also be applied to a digital beamforming structure that has a hierarchical structure by antenna sub-grouping. Moreover, while the above proposal of this invention has been made with respect to downlink transmission of signals from the base station to UE, the present invention is not limited to this. The present invention may be applied to any combination of a transmitter and a receiver. For example, the present invention may also be applied to uplink transmission from UE to the base station, UE-to-UE signal transmission (device-to-device (D2D), vehicle-to-vehicle (V2V), etc.), or signal transmission between base stations (relays, wireless backhauls, etc.).

Figure 20:
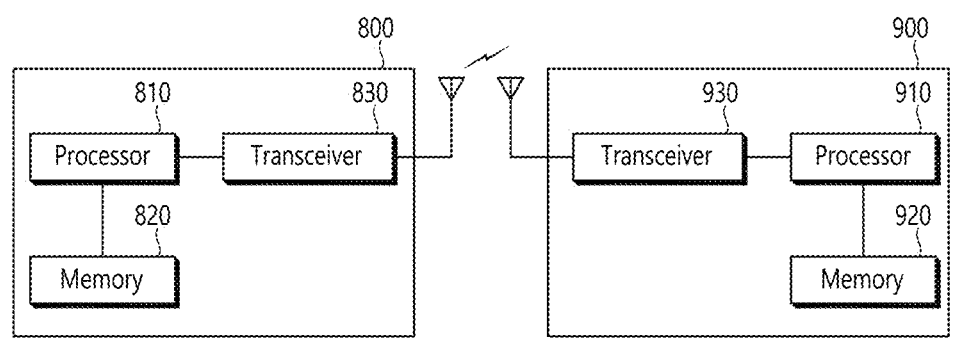
FIG. 20 shows a wireless communication system to implement an embodiment of the present invention.

FIG. 20 shows a wireless communication system to implement an embodiment of the present invention.

ABS 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a base station in a wireless communication system, the method comprising:
   receiving feedback information on a beam from a plurality of user equipments (UEs);
   grouping the plurality of UEs into a first group of UEs and a second group of UEs based on the feedback information,
   wherein the first group of UEs and the second group of UEs are located in a first area and a second area respectively, the first area and the second area are different from each other, and
   multiplexing control information for the first group of UEs and control information for the second group of UEs; and
   transmitting the control information to the first group of UEs in a first time-frequency resource based on a beam for the first group of UEs and the control information to the second group of UEs in a second time-frequency resource based on a beam for the second group of UEs,
   wherein the first time-frequency resource and the second time-frequency resource are different from each other, and
   wherein the beam for the first group of UEs and the beam for the second group of UEs are restricted to the first area and the second area respectively, based on an analog beamforming characteristic in a hybrid beamformer.

2. The method of claim 1, wherein the plurality of UEs are grouped based on the feedback information on the beam, with respect to a UE with a lowest signal quality.

3. The method of claim 1, wherein the plurality of UEs are grouped based on the feedback information on the beam, with respect to a UE with a highest signal quality.

4. The method of claim 1, wherein the plurality of UEs are grouped based on the feedback information on the beam, with respect to a UE with an average signal quality.

5. The method of claim 1, wherein the grouping of the plurality of UEs comprises shifting the beam with respect to a specific UE.

6. The method of claim 1, wherein the plurality of UEs are grouped in a horizontal direction or a vertical direction.

7. The method of claim 1, wherein the feedback information on the beam includes an identifier (ID) of the beam.

8. A base station (BS) for operating in a wireless communication system, the BS comprising:
   a memory;
   a transceiver; and
   at least one processor operatively connected to the memory and the transceiver, the processor configured to:
      control the transceiver to receive feedback information on a beam from a plurality of user equipments (UEs);
      group the plurality of UEs into a first group of UEs and a second group of UEs based on the feedback information,
      wherein the first group of UEs and the second group of UEs are located in a first area and a second area respectively, and the first area and the second area are different from each other, and
      multiplex control information for the first group of UEs and control information for the second group of UEs; and
      control the transceiver to transmit the control information to the first group of UEs in a first time-frequency resource based on a beam for the first group of UEs and the control information to the second group of UEs in a second time-frequency resource based on a beam for the second group of UEs,
      wherein the first time-frequency resource and the second time-frequency resource are different from each other, and
      wherein the for the first group of UEs and the beam for the second group of UEs are restricted to the first area and the second area respectively, based on an analog beamforming characteristic in a hybrid beamformer.

* * * * *